Oct. 22, 1957     A. M. LIPPISCH     2,810,512
AXIAL BLOWER WITH FLOW CONTROL STATOR

Filed Nov. 3, 1954     2 Sheets-Sheet 1

INVENTOR
ALEXANDER M. LIPPISCH
BY
ATTORNEY

Oct. 22, 1957  A. M. LIPPISCH  2,810,512
AXIAL BLOWER WITH FLOW CONTROL STATOR
Filed Nov. 3, 1954  2 Sheets-Sheet 2

INVENTOR.
ALEXANDER M. LIPPISCH
BY
ATTORNEY

United States Patent Office 2,810,512
Patented Oct. 22, 1957

2,810,512

AXIAL BLOWER WITH FLOW CONTROL STATOR

Alexander Martin Lippisch, Cedar Rapids, Iowa, assignor to Collins Radio Company, Cedar Rapids, Iowa, a corporation of Iowa Application November 3, 1954, Serial No. 466,593

3 Claims. (Cl. 230—114)

This invention relates to axial fans or blowers and more specifically to such blowers employing a stator with variable pitch blades to control the flow of gases.

It is more economical with the present alternating current distribution systems to install and operate alternating current motors than direct current motors to furnish power to run fans, etc. However, since alternating current motors are basically constant speed devices it is difficult to obtain proper control by speed variation of blowers which are required to deliver varied loads. Inasmuch as alternating current motors are not easily controlled in their speed variation it is necessary to vary the volume of gas delivered to the various loads by some alternate means. It has been known in the art that it is possible to provide a stator with variable pitch blades to control the flow of gases to the various loads. The blades of this stator are rotated to vary the amount of energy expended by the flow of gases against the blades; however, it is still necessary to obtain the most efficient control to the various loads over a wide range of load requirements. The most efficient operation of the fan occurs when the gases delivered to the load possess no rotational velocity. This provides the operating point of greatest efficiency since all of the energy being delivered to the load is contained in the thrust velocity of the gases. This invention provides a means of determining the necessary control of the air flow to be exerted by the stator blades and provides a means of adjusting the stator blades to obtain the most efficient use of the fan or blower at the various load requirements.

According to this invention a fan or blower is equipped with a stator having blades which are rotatable so as to control the volume of air delivered to a load. These stator blades are rotated in accordance with signals received from a feeler propeller which is located between the fan and the load. This feeler propeller is responsive to the rotational movement of the air stream which is being delivered to the load and will by its rotation adjust the stator blades until there is no rotational velocity to the air stream being delivered to the load.

It is a feature of this invention to provide a control means for the stator of an axial blower which is responsive to the axial flow of gas. It is another feature of this invention to provide this control using a minimum of the useful power of the fan's output.

It is an object of this invention to provide a control device which will control the volume of gas delivered to various loads by an axial fan so that only the necessary amount of gas is delivered to meet the various load demands. It is a further object of this invention to provide a control means which is economical in its power requirements. It is still another object of this invention to provide control means which use a minimum of operating parts. Additional objects and advantages of this invention will be apparent in the following description taken in conjunction with the accompanying drawing, in which:

Figure 1:
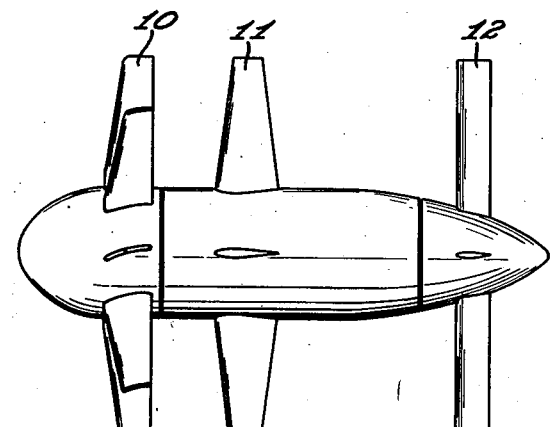
Figure 1 is a side elevation view of an axial blower with flow control stator and this invention.
Figure 2:
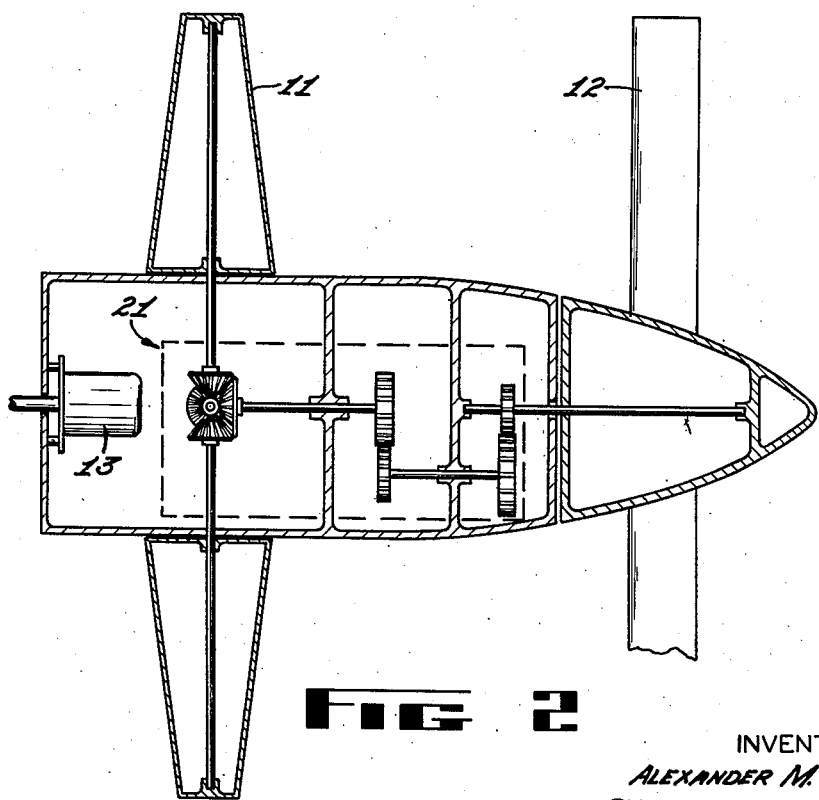
Figure 2 is a side elevation view in section of an axial blower with flow control stator and this invention.

In the embodiment of this invention illustrated in Figures 1 and 2 a constant speed motor 13 is placed so as to drive the fan blades 10 at a constant speed. This motor may be of the conventional alternating current type and may be placed in any position which will drive the fan blades. The air or gas which is placed in motion by the rotation of the fan 10 passes the stator blades 11 and the feeler propeller 12 and is delivered to the load. The blades of the feeler propeller are of a well known design with a ninety degree pitch angle. The fan delivers a constant volume of air inasmuch as it is a constant speed device. The stator blades are so designed that if there should be a variation in the load requirement the stator blades are rotated in a well known manner so that the proper volume of air is delivered to meet the load requirement. The remaining air is expended against the stator blades. It has been found that to obtain the greatest efficiency from the air stream as it passes the stator blades there should be no rotational velocity. The air stream should thus be composed only of thrust velocity for maximum efficiency. The feeler propeller 12 is able to ascertain when there is rotational movement of the air stream being delivered to the load.

The feeler propeller because of its blades of ninety degree pitch angle is very sensitive to the smallest amount of rotation in the air stream passing it and inasmuch as it is sensitive to the rotational velocity of the air stream the slightest rotational velocity will rotate the feeler propeller in the direction of the rotation of the air stream. This rotation of the feeler propeller delivers a control signal to the mechanism controlling the rotation of the stator blades.

If the feeler propeller 12 is caused to rotate the shafts of the gear train 21 will be placed in motion. It is necessary that this gear train be designed so that it provides a considerable reduction in speed and a considerable increase in the torque from the rotation of the feeler propeller to the rotation of the stator blades. This torque increase is necessary to overcome the aerodynamic couplings which exist around the axes of the stator blades.

Figure 3:
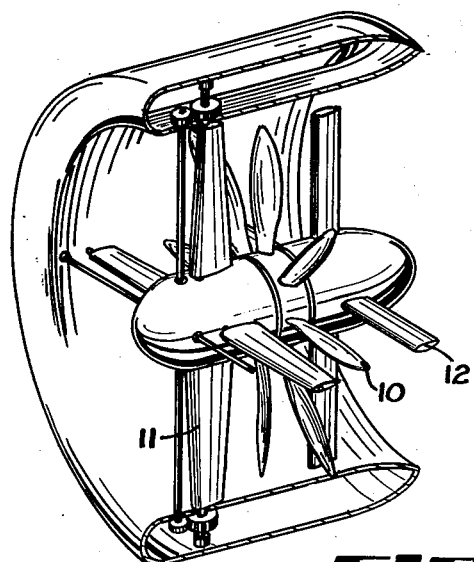
Figure 3 is a perspective view of another embodiment of the invention.
Figure 4:
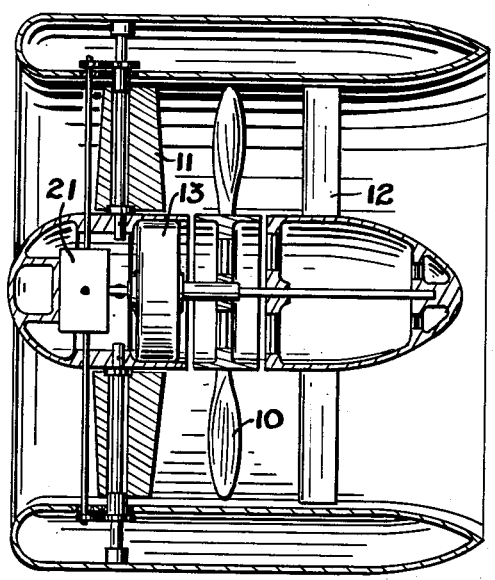
Figure 4 is a sectional view of a side elevation of the device shown in Figure 3.

Another embodiment of this invention is shown in Figures 3 and 4. Like numbers in Figures 3 and 4 refer to corresponding elements in Figures 1 and 2. The operating principle in the embodiment shown in Figures 3 and 4 is exactly the same as that in Figures 1 and 2. The feeler propeller 12 is in the shroud ahead of the motor 10 in this embodiment. The rotation of the feeler propeller 12 rotates the shaft on which it is supported. This shaft passes through the driving shaft from the motor 13 to the propeller 10. This shaft from the feeler propeller is connected to the gear box 21 which adjusts the stator blades 11. The stator blades are adjusted through a gear mechanism including gears in the outer ring. In this embodiment the stator blades are supported on the inner structure which encloses the motor 13 and are rotated about the fixed connections to the outer ring.

Although this invention has been described with respect to particular embodiments thereof, it is not to be so limited as changes and modifications may be made therein which are within the full intended scope of the invention as defined by the appended claims.

What is claimed is:

1. A blower system comprising an axial blower with a constant speed motor, a stator structure having a number of rotatably adjustable blades in circumferentially spaced relation, said stator structure being fixed around the axis of the axial blower, a feeler propeller having blades with a ninety degree pitch angle responsive to the rotational velocity about the axis of said axial blower of the air stream delivered to a load and a gear train connected to said feeler propeller and said stator blades whereby rotational movement of said feeler propeller is transmitted to said stator blades to rotatably adjust said blades.

2. A blower system comprising an axial blower with a constant speed motor, a stator structure having a number of rotatably adjustable blades in circumferentially spaced relation, an outer ring surrounding said blower system, said stator structure being fixed around the axis of the axial blower and to said outer ring, a feeler propeller having blades with a ninety-degree pitch angle responsive to the rotational velocity about the axis of said axial blower of the air stream delivered to a load, and a gear train connected to said feeler propeller and said stator blades whereby rotational movement of said feeler propeller is transmitted to said stator blades to rotatably adjust said blades.

3. A blower system as defined in claim 2 where said gear train includes gearing means within said outer ring.

References Cited in the file of this patent

UNITED STATES PATENTS

| | | |
|---|---|---|
| 1,931,158 | Biggs | Oct. 17, 1933 |
| 2,455,251 | Hersey | Nov. 30, 1948 |
| 2,460,778 | Willgoos | Feb. 1, 1949 |
| 2,653,754 | McDonald | Sept. 29, 1953 |
| 2,689,680 | Lovesey | Sept. 21, 1954 |